Aug. 6, 1935.  R. LAPSLEY  2,010,367

BALL AND SOCKET JOINT

Original Filed June 29, 1931

Inventor:
Robert Lapsley
By [signature]
Attys.

Patented Aug. 6, 1935

2,010,367

UNITED STATES PATENT OFFICE 2,010,367

BALL AND SOCKET JOINT

Robert Lapsley, Berrien Springs, Mich., assignor to Clark Equipment Company, Buchanan, Mich., a corporation of Michigan Original application June 29, 1931, Serial No. 547,577. Divided and this application August 22, 1932, Serial No. 629,917

4 Claims. (Cl. 287—87)

This application is a division of my copending application (Case 8) Serial No. 547,577, filed June 29, 1931, for Transmission control mechanism.

The present invention relates generally to transmissions for automobiles and the like and is particularly concerned with the gear shifting mechanism for selecting and bringing into operative relation the various desired gear ratios. More specifically, the present invention contemplates the provision of an improved ball and socket mounting for the gear shift lever of the transmission. Briefly, my improved ball and socket mounting comprises a stationary socket adapted to receive the ball or spherical head of the lever and which is provided with means to effectively hold the spherical head in place and which may be quickly and easily removed to permit disassembly of the ball and socket mounting, and which is also so arranged that accidental disassembly is effectively precluded. While my improved structure is particularly advantageous when employed in the improved gear shifting mechanism disclosed and claimed in my above mentioned copending application, of which this application is a division, it will be apparent that my improved ball and socket mounting may be employed in other situations.

Another object of the present invention is the provision of a ball socket construction which is self-adjusting, requires no attention and will not loosen or become noisy. In this connection my improved ball and socket construction is particularly advantageous in automotive vehicles where vibration is more or less always present.

Figure 2:
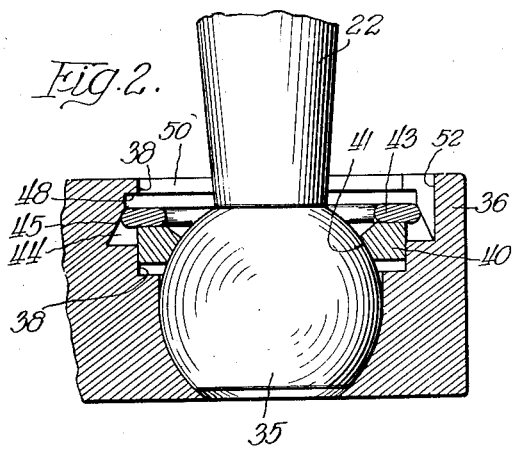
Figure 1:
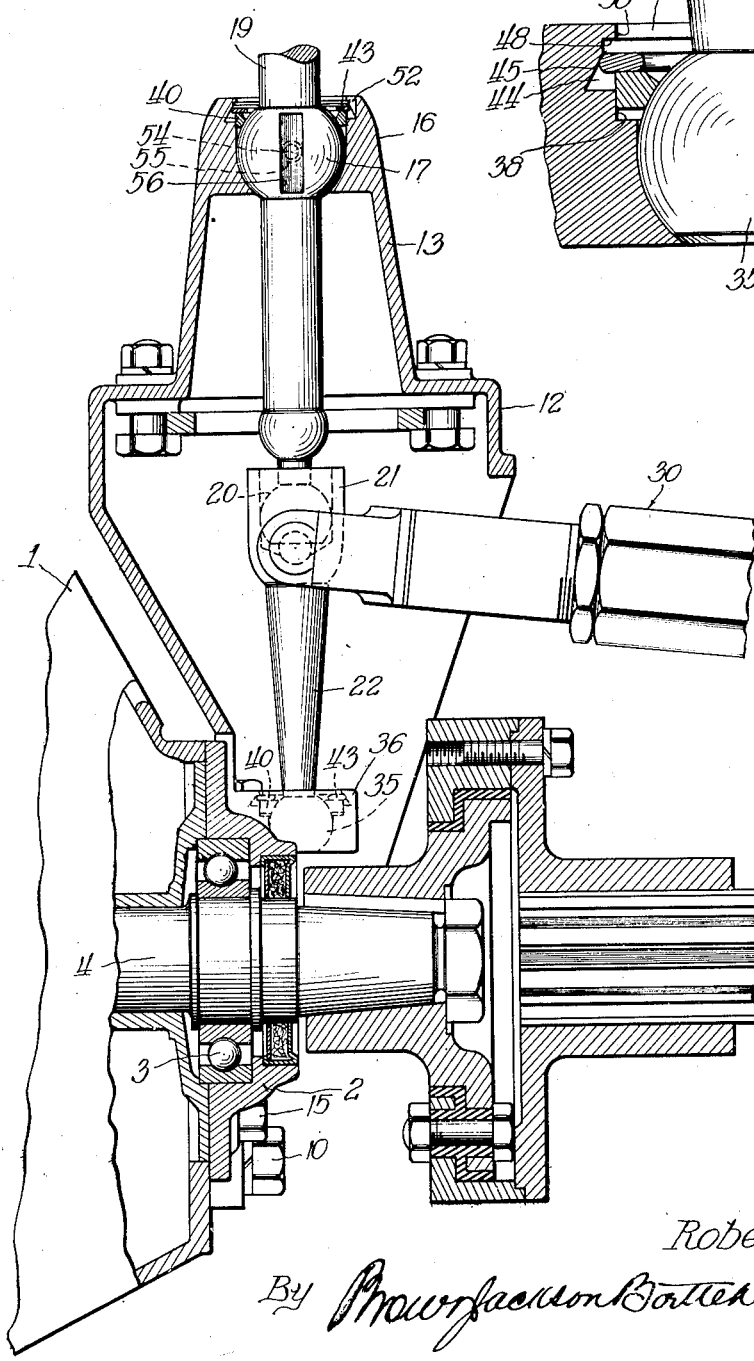

These and other objects of the present invention will be apparent to those skilled in the art after a consideration of the following detailed description of the preferred structural embodiment, taken in conjunction with the accompanying drawing, in which:

Figure 1 is a longitudinal vertical section taken through a transmission embodying the principles of the present invention and showing, in addition, certain details of the construction more completely described in my copending application above mentioned; and Figure 2 is an enlarged view showing the socket mounting for one of the gear shift levers.

Referring now to the drawing, the reference numeral 1 indicates in its entirety the clutch housing of the motor of an automotive vehicle and as there shown includes a bearing plate 2 in which is journaled, as by anti-friction bearing means 3, the clutch shaft 4 which is normally driven by the motor of the vehicle. The transmission gear box is spaced rearwardly of the clutch housing 1 and is separately supported from the main frame of the vehicle by an arm or cross members, as will be more readily understood by referring to the copending application mentioned above. The transmission, of course, may be supported in any other manner if desired.

The transmission (not shown) includes the usual arrangement of selectively operated gears arranged to establish different gear ratios and the usual arrangement of driving and driven transmission shafts. For selecting and changing the various gear ratios the transmission is provided with several shift rods, as is usual in the present-day type of construction. For actuating these shift rods a short lever is swiveled for rocking movement in a socket mounting carried by the transmission, as more completely described in my copending application. For the purposes of this application it is sufficient to note that this short lever, controlling the shift rods, is itself actuated by a generally longitudinally extending control member actuated by a gear shift lever disposed adjacent the operator's position on the vehicle, as will appear later.

It is in certain details of construction in the connections by which the shift rods are controlled that the specific features of the present invention have, perhaps, their greatest usefulness.

Referring now particularly to Figure 1, the clutch housing 1 has secured to it, by bolts 10 or the like, a mounting bracket indicated in its entirety by the reference numeral 12. The mounting bracket 12 comprises an upper pedestal portion 13 and lower forked members through which the bolts 10 pass and which embrace the bearing plate 2, the latter being secured to the clutch housing 1 by means of bolts 15.

The other portion of the pedestal 13 carries the socket mounting 16 in which is swiveled for universal movement the spherical head 17 on the manually operated gear shift lever 19.

The lowermost end 20 of the gear shift lever 19 is rounded substantially in the form of a ball thereon. The ball end 20 is received within the cylindrical cup portion 21 of a rocking lever 22 the lower end 35 of which is also rounded and is received within a socket mounting 36 similar in form to the socket mounting 16 described above. The socket 35 is preferably formed integrally with the bearing plate 2 although it may, if desired, be separately formed and secured to the clutch housing 1 in any manner. By virtue of the ball and socket connection between the lower end of the gear shift lever 19 and the rocking lever 22 it will be apparent that as the gear shift lever 19 is moved through the various gear shifting movements the rocking lever 22 will be caused to execute a corresponding movement.

The connections I have provided between the rocking lever carried by the transmission and associated with the shift rods and the rocking lever 22 by which the former is constrained to move with the latter are fully described in my copending application referred to above and need not be described here except to note that these connections take the form of a connecting link 30 having a forked connection with the forward rocking lever 22 and with the rear rocking lever carried by the transmission as mentioned above. The connecting link is preferably constructed of sections whose relative position may be adjusted but which are, when adjusted, rigidly secured in position so as to be able to transmit the torque necessary to shift the rear rocking lever from one shift rod to another.

It is, of course, obvious that as the manually operated gear shift lever is moved forwardly or rearwardly the short lever 22 is rocked in the same plane and will cause the rear lever to be rocked forwardly or rearwardly. This movement will shift the selected one of the shift rods in the usual manner to effect driving engagement in the selected gear ratio.

The socket mountings for the gear shift lever 19 and the rocking lever 22, and also the socket mounting for the rear rocking lever (not shown) adjacent the transmission, are all substantially identical in their essential characteristics, and these mountings form the details of the present invention. Since all of these mountings are substantially identical, they will be sufficiently disclosed if one of them is described in detail. For this purpose the socket mounting for the lower end of the rocking lever 22 will be chosen as is shown in Figure 2 on a somewhat larger scale.

Referring now more particularly to Figure 2, the ball end 35 of the rocking lever 22 is substantially spherical and is seated in the socket member 36 the lower portion of which is spherical in outline to correspond to the surface of the ball end 35. The upper portion 38 of the socket recess is substantially cylindrical and is of somewhat greater diameter than the diameter of the ball or spherical head 35. A retaining ring 40 is slidably mounted in the cylindrical recess 38 and is formed with an inner surface 41 to correspond to the spherical surface of the head 35. In order to retain the head 35 in its seat in the socket mounting 36 it is desirable to provide some sort of means for resiliently urging the retaining ring 40 downwardly against the upper part of the head 35. The means I have provided for this purpose comprises a split spring ring 43 having rounded inner and outer circumferences and adapted to seat in an undercut recess or groove 44 having an upper wall 45 which is tapered so as to converge in an upward direction. The inherent resiliency of the spring ring tends to cause the same to expand and this tendency being exerted against the tapered or inclined upper wall causes the ring 43 to exert a downward force against the retaining ring 40.

The upwardly converging wall 45 terminates in a shouldered groove 48 which forms a ledge 50 directed inwardly of the recess 38 and which serves as a stop to prevent the accidental displacement of the spring ring 43. That is, should the head 35 be moved upwardly with an excessive force the spring ring 43 would be compressed as it is moved by the movement of the head up toward the top of the tapered wall 45. However, by virtue of the abrupt walls of the ledge 50 the spring ring 43 cannot be forcibly moved out of the recess 38 by an upward movement of the lever head 35.

For the purposes of assembly and disassembly it is necessary, however, to provide some means to permit the easy insertion and removal of the head 35. For this purpose I form a small vertical slot 52 which permits a tool, such as a screw driver or the like, to be inserted in the recess 38 and behind the spring rings 43. It is then a simple matter to pry the spring ring 43 out of the recess 38 entirely, and after this is done the lever 22 and the retaining ring 40 may simply be lifted out of the socket mounting 36.

Since the other levers are mounted in a similar way a detailed description is believed unnecessary. In connection with the gear shift lever 19, however, it is to be noted that the socket 16 is provided with a pair of opposed bores each of which receive a pin 54. A small roller 55 is journaled on the inner end of each of the pins 54. These rollers are received within a vertical slot 56 formed on either side of the spherical head 17 of the gear shift lever 19. The purpose of this construction is to permit the gear shift lever to have full universal movement in its socket mounting 16 while precluding the rotation of the gear shift lever 19 which might place the upper end of the same out of proper position with respect to the driver's or operator's seat.

It is to be understood that although I have described the socket mountings as associated with the rocking levers of a transmission mechanism the principles of the present invention are applicable to vastly different conditions. It is also to be understood that, while I have shown and described above the preferred structural embodiment of the present invention, my invention is not to be limited to the specific means shown and described but that, in fact, widely different means may be employed in the practice of the broader aspects of my invention.

What I claim, therefore, and desire to secure by Letters Patent is:

1. A socket mounting for a lever for shifting gears, comprising a spherical head on said lever, a stationary support having a socket one portion of which is formed to receive the spherical head, the other portion being generally cylindrical, there being an annular undercut groove having a tapered upwardly converging wall formed in said cylindrical portion, and an inwardly extending ledge, a retaining ring contacting with said head opposite its seat in said socket and mounted in said cylindrical portion, and a split spring ring seated against said retaining ring and pressed outwardly against said tapered wall to urge the retaining ring downwardly against the spherical head of the gear shift lever, said cylindrical portion being provided with a slot to permit the insertion of a tool to remove the spring ring from said portion, and said ledge acting to prevent the inadvertent displacement of said spring ring.

2. In a transmission system, a socket mounting for a gear shift lever, comprising a spherical head on said lever, a stationary support having a socket one portion of which is formed to receive the spherical head, the other portion being generally cylindrical, there being an annular undercut groove having a tapered upwardly converging wall formed in said cylindrical portion below the upper edge thereof, said undercut groove terminating in a cylindrical groove of slightly greater diameter than the diameter of said generally cylindrical portion, leaving a radially inwardly overhanging ledge at the upper edge of said cylindrical portion, a retaining ring contacting with said head opposite its seat in said socket and mounted in said cylindrical portion, and a split spring ring seated against said retaining ring and pressed outwardly against said tapered wall to urge the retaining ring downwardly against the spherical head of the gear shift lever, said spring ring being adapted to seat in said cylindrical groove underneath said overhanging ledge when the ring is forced upwardly past said tapered wall and said cylindrical portion being provided with a slot to permit the insertion of a tool to remove the spring ring from said cylindrical groove past said ledge.

3. A socket mounting for a rocking lever, comprising a spherical head on said lever, a stationary support having a socket one portion of which is formed to receive the spherical head, the other portion having tapered outwardly converging walls terminating in an inwardly extending shoulder, a retaining ring contacting with said head opposite its seat in said socket, and a spring ring seated against said retaining ring and pressed outwardly against said tapered wall to urge the retaining ring downwardly against the spherical head of the gear shift lever, said inwardly extending shoulder serving to lock said spring ring in seated position.

4. A socket mounting for a member having a spherical head thereon, comprising a support having a socket one portion of which is formed to receive the spherical head, the other portion having an annular undercut groove with a tapered upwardly converging wall formed therein and terminating in a cylindrical groove having an inwardly directed ledge, a retaining ring contacting with said head opposite its seat in said socket, and a spring ring seated against said retaining ring and pressed outwardly against said tapered wall to yieldingly urge the retaining ring downwardly against the spherical head, said groove and ledge being formed to receive said spring ring to prevent accidental displacement thereof from said socket.

ROBERT LAPSLEY.